United States Patent [19]
Kelly et al.

[11] 3,772,588
[45] Nov. 13, 1973

[54] DUAL CONTROL LOOP SWITCHING REGULATOR

[75] Inventors: William J. Kelly; Robert J. Titus, both of Sauquoit, N.Y.

[73] Assignee: Cogar Corporation, Wappingers Falls, N.Y.

[22] Filed: Oct. 1, 1971

[21] Appl. No.: 185,590

[52] U.S. Cl. ............... 323/17, 321/2, 323/20, 323/22 T, 323/DIG. 1
[51] Int. Cl. ............................................. G05f 1/56
[58] Field of Search ............... 307/297; 321/2, 19; 323/1, 17, 20, 22 T, DIG. 1

[56] References Cited
UNITED STATES PATENTS

| | | | |
|---|---|---|---|
| 3,571,697 | 3/1971 | Phillips | 323/DIG. 1 |
| 3,068,392 | 12/1962 | Santelmann, Jr. | 323/DIG. 1 |
| 3,320,512 | 5/1967 | Kruger | 323/DIG. 1 |
| 3,638,096 | 1/1972 | Judd et al. | 321/2 |

*Primary Examiner*—A. D. Pellinen
*Attorney*—Harry M. Weiss et al.

[57] ABSTRACT

A switching regulator having a conventional switching transistor and filter, and DC feedback loop which controls the duty cycle of the switching transistor in accordance with the output voltage. The regulator includes an additional AC feedback loop, the input to the feedback path being taken at a point in the forward path of the regulator which precedes the filter. In this way, the filter is not included in the second loop and this second loop can have a higher cross-over frequency than the DC loop so that the line ripple which would otherwise appear at the output can be suppressed.

15 Claims, 1 Drawing Figure

PATENTED NOV 13 1973
3,772,588
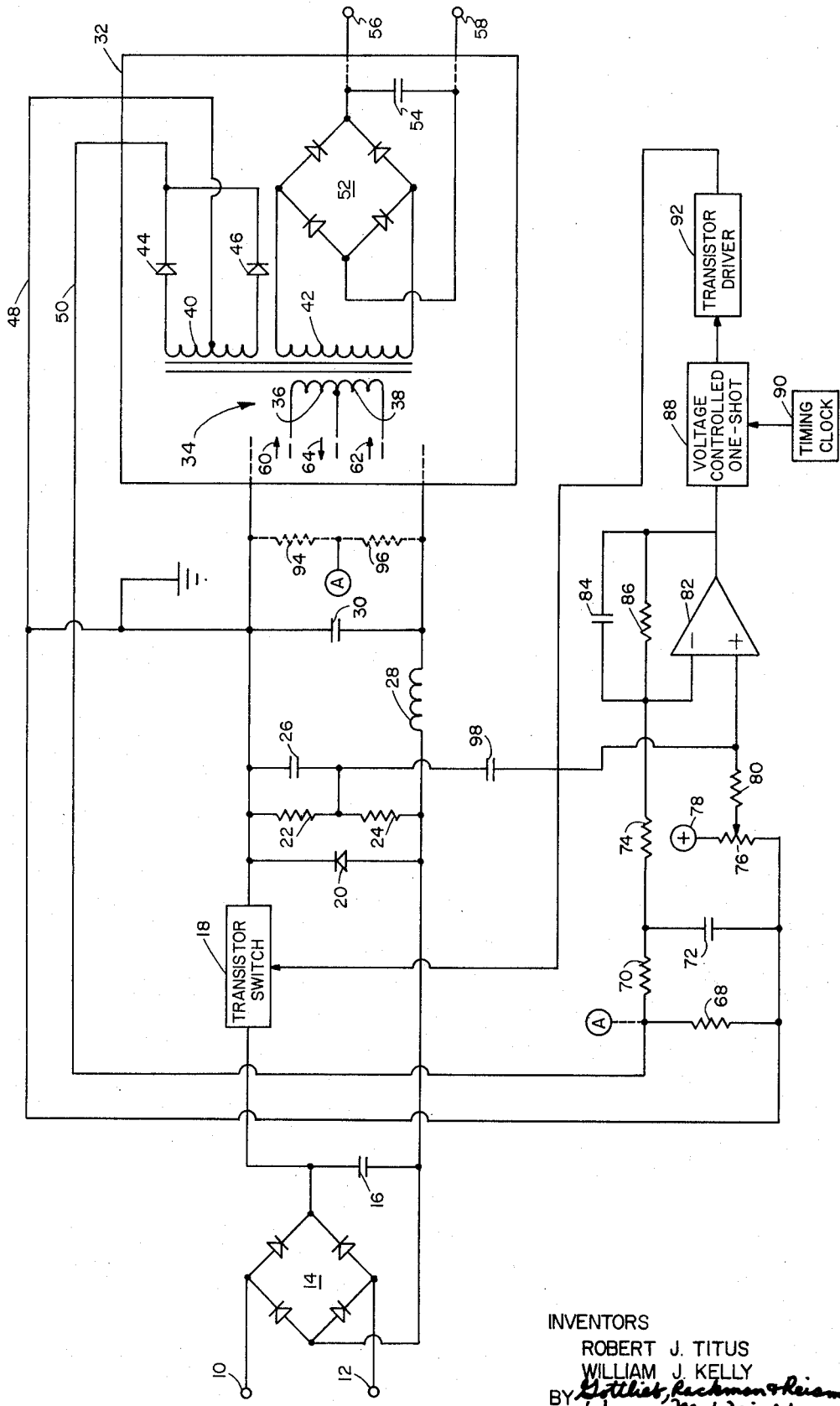
INVENTORS
ROBERT J. TITUS
WILLIAM J. KELLY
BY Gottlieb, Rackman & Reisman
Harry M Weiss
ATTORNEYS

DUAL CONTROL LOOP SWITCHING REGULATOR

This invention relates to switching regulators, and more particularly to switching regulators having improved ripple suppression.

A typical switching regulator includes an unregulated DC source which is connected through a transistor switch and filter to output terminals. A filter capacitor is generally connected across the output terminals. The transistor switch is turned on at a relatively high rate, for example, 10–20 kHz. The switch is turned off during each cycle of operation at a time dependent upon the instantaneous output voltage. For example, if the output voltage tends to rise, e.g., as a result of an increase in the magnitude of the unregulated source, the duty cycle of the transistor switch is decreased so that less current is delivered to the output during each cycle. Because the transistor switch operates at a high rate, low-frequency changes in the input can be compensated for so that they do not appear in the output. The high switching rate of the transistor switch itself, however, would tend to produce a high-frequency ripple in the output. It is the filter which eliminates this ripple.

The regulated output voltage is often used to power a DC-to-DC converter. The converter is typically of the "chopper" type in which the DC voltage supplied by the switching regulator might be used to derive square-wave signals applied to primary windings of a step-up transformer. The high-voltage pulses across the secondary winding are then rectified and filtered to produce a high DC voltage. It is generally found, however, that the output of the "chopper" contains a ripple, that is, harmonics of the line frequency. For this reason, a typical chopper circuit includes a series regulator for eliminating the ripple. The larger the ripple, the greater the voltage which must be dropped across the series regulator. If the magnitude of the ripple caused by the alternating line current could be reduced in the output of the switching regulator, then there would be no need for a series regulator in the chopper, or if such a series regulator is still required then it would have to drop a much smaller voltage across it.

It is a general object of our invention to provide a switching regulator in which the output ripple caused by the alternating line current is greatly reduced.

Consider the case of a switching regulator which is operated at 20-kHz rate. In order to eliminate the resulting 20-kHz ripple in the output, the filter included in the switching regulator should have a resonant frequency in the order of 2 kHz. (A design rule often used is that the resonant frequency of the filter be less than one-tenth of the switching rate in order that the filter eliminate the ripple introduced by the switching transistor.) The switching regulator is a servo system — the output voltage is monitored and used to control the duty cycle of the switching transistor. The filter is necessarily in the loop since it is included in the system between the transistor switch and the output. But the filter introduces such a large phase shift at frequencies near its resonant frequency that the feedback loop is likely to be unstable at frequencies near the resonant frequency. For this reason, to prevent oscillations, the closed-loop gain of the system is made less than unity at all frequencies above a minimum value. This minimum value is often taken to be one-tenth that of the resonant frequency. Thus in the case of a 20-kHz switching rate, the resonant frequency of the filter may be in the order of 2 kHz and the gain of the servo system may be less than unity at all frequencies above 200 Hz.

The net result of these considerations is that the gain of the servo loop may be so low at the lower frequencies that the switching regulator is capable of eliminating only DC variations (in the order of a few Hz) in the output. Since the filter eliminates only high-frequency variations, that is, variations at frequencies well above 2 kHz, variations at frequencies in the intermediate range are not suppressed. If the input voltage is derived from a fullwave rectifier, the output voltage can contain a substantial 120-Hz ripple component, and multiples of it. An additional mechanism must be provided to eliminate the ripple caused by the alternating line current. In the case of a DC-to-DC converter which is powered by the output voltage of the switching regulator, this mechanism generally takes the form of a series regulator.

In accordance with the principles of our invention, a conventional switching regulator, filter and servo circuit are provided to eliminate the very low frequency and the very high frequency components from the output voltage of the switching regulator system. The output voltage is used in the feedback loop to control the duty cycle of the transistor switch to eliminate the low-frequency components and the filter eliminates the high-frequency components. But rather than to employ the conventional single-path feedback, we provide a second feedback path. The unfiltered output voltage of the transistor switch is also used to control the duty cycle of the switch together with the filtered output voltage. The unfiltered output voltage is taken at a point preceding the filter and for this reason the filter is not included in the second feedback path. Because the filter is not included in the second feedback path there is no need to limit the closed-loop gain of the second path to a value below unity at frequencies above 200 Hz in the example under consideration. There is no danger of instability even at the resonant frequency of the filter because the filter is not in the second closed-loop path. The conventional feedback path is a "DC" path because it is very low-frequency variations which are controlled by it. The second feedback path is an "AC" path because it is higher-frequency variations which are controlled by it. The net result is that the ripple in the output voltage caused by the alternating line current is greatly reduced.

It is a feature of our invention to provide two feedback paths for a switching regulator, the input to the first path being taken from the filtered output of the regulator and the input to the second path being taken from the unfiltered output of the regulator.

Further objects, features and advantages of our invention will become apparent upon consideration of the following detailed description in conjunction with the drawing which depicts an illustrative embodiment of the invention.

Referring to the drawing, the line voltage is applied across terminals 10, 12 and the 60-cycle line current is rectified by bridge 14 to provide an unregulated DC source voltage across capacitor 16. The switching regulator includes a conventional transistor switch 18 and an output filter comprising inductor 28 and capacitor 30. The transistor switch 18, when it is turned on, conducts current from capacitor 16, the current flowing from the capacitor through the transistor switch, capacitor 30 and inductor 28. When the transistor switch is turned off, current continues to flow through the filter and diode 20, the diode serving the conventional "commutating" function as is known in the art.

In a typical application, the DC voltage across output capacitor 30 of the switching regulator is used to power a DC-to-DC converter 32. The details of the converter are not important for an understanding of the present invention and therefore the operation of the converter is shown only symbolically. The converter includes a transformer 34 with two primary windings 36, 38. The DC voltage across capacitor 30 is "chopped" so that current alternately flows through winding 36 (in the direction of arrows 60,64) and winding 38 (in the direction of arrows 62, 64). The stepped-up voltage across secondary winding 42 is rectified by bridge 52 so that a large DC voltage appears across capacitor 54. In the absence of any significant ripple across the capacitor, output terminals 56, 58 can be connected through a filter directly across the capacitor. In the presence of ripple, a series regulator, with an appropriate feedback loop, is generally provided so that a regulated output can be achieved.

Transformer 34 includes an auxiliary secondary winding 40 with two rectifying diodes 44, 46. The diodes rectify the alternating voltage across the auxiliary secondary winding so that a DC voltage appears across conductors 48, 50. Conductor 48 is shown grounded in the drawing, although any convenient reference point can be considered to be "ground." The voltage on conductor 50 is the input voltage to the DC feedback path of the system.

The voltage appears across bleeder resistor 68 and is applied through the network including capacitor 72 and resistors 70, 74 to the minus input of amplifier 82. As a result of feedback elements 84, 86 the amplifier operates as an integrator. The reference potential applied to the plus input of the amplifier is derived from source 78 (typically, a Zener diode) and is controlled by the setting of potentiometer 76.

The voltage on conductor 50, after being smoothed by capacitor 72, is proportional to the voltage across capacitor 54 in the chopper since it is derived from an auxiliary winding on transformer 34. At low frequencies, capacitor 84 can be ignored and the gain of the amplifier 82 from the junction of elements 70, 72, 74 to the output of the amplifier is, as is known in the art, equal to the ratio of the magnitudes of resistors 86 and 74. The output voltage of amplifier 82 is used to control the width of each pulse generated by one-shot multivibrator 88. The multivibrator is triggered at a 20-kHz rate by timing clock 90. The width of each pulse varies inversely with the magnitude of the voltage on conductor 50, that is, the larger the voltage, the shorter the width of each pulse generated by the voltage-controlled one-shot multivibrator. Whenever the multivibrator conducts, transistor driver 92 is turned on, and the driver in turn controls conduction of transistor switch 18. The duty cycle of transistor switch 18 thus varies inversely with the magnitude of the voltage on conductor 50. As the voltage tends to increase, the duty cycle of the transistor switch decreases so that less current is delivered to capacitor 30 during each cycle of operation. The feedback insures that the voltage across capacitor 30 is maintained constant at a value determined by the setting of potentiometer 76.

Systems of the type described thus far are well known to those skilled in the art. In the event the voltage across capacitor 30 is not used to drive a chopper supply, the voltage across the capacitor can be used directly as the input to the feedback path. In such a case, resistors 94, 96, shown in phantom in the drawing, can be connected across capacitor 30 with the junction of the resistors, labeled A, being connected to the junction of resistors 68 and 70 as indicated in the drawing. In such a case, conductor 50 would be omitted inasmuch as the feedback voltage applied across resistor 68 would be derived directly from the voltage divider connected across capacitor 30. In an overall system which includes a chopper supply, it is preferable to derive the feedback voltage from an auxiliary winding on the chopper transformer because the signal applied to the DC feedback path will reflect variations in the output voltage across terminals 56, 58 which are introduced by the chopper itself. Since the goal is to derive a regulated voltage across terminals 56, 58, it is advantageous to sense variations introduced by the chopper supply itself. However, no matter where the input signal for the feedback path is derived, the duty cycle of transistor switch 18 is controlled to regulate the output voltage.

The only elements not described thus far are elements 22, 24, 26 and 98, and the manner in which these elements are connected to the plus input of amplifier 82. These elements comprise the "AC path" described above. Before this second feedback path is considered, however, it will be helpful to consider once again the theory of operation of the prior art switching regulator in order to realize why it is generally not possible to eliminate a 120-Hz ripple (and its harmonics) in the output voltage across capacitor 30.

The filter which includes inductor 28 and capacitor 30, together with diode 20, is an averaging circuit. Transistor switch 18 supplies current pulses to the averaging circuit. Since the transistor is switched on at a 20-kHz rate, each period of the switch operation is 50 microseconds. If the input voltage across capacitor 16 is, for example, 150 volts, and it is desired to maintain 100 volts across capacitor 30, then transistor switch 18 conducts for only 100/150 or two-thirds of each cycle, that is, for 33.33 microseconds during each 50-microsecond cycle. If the input voltage across capacitor 16 increases from 150 volts to 200 volts, then the feedback loop which includes amplifier 82, voltage-controlled one-shot multivibrator 88 and transistor driver 92 will change the width of each current pulse delivered by switch 18 to 25 microseconds to maintain 100 volts across capacitor 30. Because current pulses are delivered to the averaging circuit at a 20-kHz rate, there would normally be a 20-kHz ripple in the output voltage across capacitor 30, along with even higher harmonics. To eliminate this ripple, the averaging circuit is designed to have a resonant frequency which is considerably lower than 20 kHz. In a conventional design, the resonant frequency is no higher than one-tenth of the switching rate. The averaging circuit is thus a low-pass filter and filters out the high-frequency components. But the filter is in the forward path of the servo loop and it thus introduces a large phase shift at its resonant frequency. It is well known that servo systems of the type described tend to oscillate if the closed-loop gain of the loop is unity or greater at frequencies where the total phase shift around the loop is 360°. For this reason, for maximum safety, the loop gain is made to fall below unity at all frequencies which are greater than about 10 percent of the resonant frequency of the filter. In the case of a resonant frequency of 2 kHz, the servo loop would be designed to "cross over" (unity gain) at 200 Hz. Although the gain at 120 Hz in such a case can be greater than unity, it is generally insufficient for eliminating the 120-Hz ripple across capacitor 30, as well as the lower-amplitude but higher-frequency harmonics. Of course, a solution to the problem would be to increase the switching rate and the filter resonant frequency, but this is not always practical because unless very expensive components are used it is not possible to rapidly turn off conducting switching transistors.

It is for this reason that in the prior art an additional series regulator is often used to suppress the 120-Hz ripple. Typically, the series regulator would be included in chopper 32 between capacitor 54 and output terminals 56, 58. It is the provision of the second "AC" feedback path in the circuit of the drawing that suppresses the 120-Hz ripple across capacitor 30 and either eliminates the need for a series regulator altogether or reduces the voltage which must be dropped by the series regulator if one is used.

In the circuit of the drawing, the resonant frequency of the filter can be selected to be 600 Hz to insure the effective suppression of the 20-kHz ripple which would otherwise appear across capacitor 30 as a result of the transistor switch operation. With such a resonant frequency, the magnitudes of the various components in the feedback path must be such that at some relatively low frequency the loop gain drops below unity so that no oscillations can occur at higher frequencies. In the circuit of the drawing, the cross-over point can be selected at 7 Hz. This means that the DC servo loop is effective to regulate the output voltage only with respect to very low frequencies. If the voltage across capacitor 16 changes very slowly (referred to as "DC" changes), these changes will not be reflected at the output. However, except for the very high frequency variations which are suppressed by the filter, intermediate frequency variations at the input are reflected in the voltage across capacitor 30 — including the 120-Hz ripple.

This ripple is eliminated by the provision of a second feedback path. This feedback path is referred to as an "AC path" because it is designed to eliminate higher frequency variations, and because it is capacitor-coupled to an input of amplifier 82 unlike the DC path. Resistors 22 and 24 are a voltage divider, with capacitor 26 being provided for stability purposes. It will be noted that both of capacitors 26 and 30 are grounded. The voltage across capacitor 26, however, is considerably different from the voltage across capacitor 30. This is due to the fact that inductor 28 (together with resistor 24) separates the two elements. The negative voltage at the junction of capacitor 26 and resistors 22 and 24 is proportional to the unfiltered output voltage of the transistor switch. This output voltage is extended through capacitor 98, which blocks the DC component across capacitor 26, to the plus input of amplifier 82. If the voltage across capacitor 26 tends to increase, transistor switch 18 is made to conduct for a shorter time interval during each pulsing operation. The net effect of the AC feedback path is that another form of control is provided for adjusting the duty cycle of the transistor if the output voltage tends to change. The cross-over for the AC loop is approximately 2 kHz, that is, the closed-loop gain is sufficiently high for frequencies below the cross-over frequency that the 120-Hz ripple at the input is effectively eliminated from the output. The important point to note is that the input to the AC feedback path is taken at a point in the forward path of the system which is prior to the filter. Thus the filter is not included in the overall AC feedback path. Even though the AC and DC feedback inputs are extended to the same amplifier 82 in the feedback loop, the DC path includes the low-pass filter while the AC path does not. Because there is no filter in the AC loop, its cross-over frequency can be much higher and thus it is possible to suppress the line ripple which would otherwise be present in the output.

The net effect is that the DC feedback path provides servo control for DC (very low-frequency) changes, the AC feedback path provides servo control for intermediate-frequency changes (including line ripple components), and the L-C filter serves to filter out very high-frequency components, including frequency components introduced by transistor switch 18. Resistor 22 and capacitor 26 are the elements which make the response of the AC path fall at higher frequencies since at very high frequencies the capacitor is a short and the "AC" feedback voltage is ground.

The selection of component values for the switching regulator shown in the drawing will be apparent to those skilled in the art since the basic DC path configuration is well known. However, the following frequency-determining component values have been found to be particularly desirable:

| Component | Value |
|---|---|
| resistor 22 | 10k |
| resistor 24 | 220k |
| capacitor 26 | 0.1 μf |
| inductor 28 | 3 mh |
| capacitor 30 | 20 μf |
| capacitor 84 | 2.2 μf |
| resistor 86 | 510k |
| resistor 68 | 100 ohms |
| resistor 70 | 1k |
| capacitor 72 | 100 μf |
| resistor 74 | 8.2k |
| potentiometer 76 | 10k |
| resistor 80 | 5k |
| capacitor 98 | 22 μf |

If Bode plots are made for the two open-loop responses, it is found that for the low-frequency or DC path the response is flat at approximately 44 db until approximately 0.16 Hz. At this point, resistor 66 and capacitor 84 introduce a down break and the plot slopes downward at a slope of 3 db/octave until a frequency of approximately 1.1 Hz at which frequency the gain is approximately 25 db. At this point there is another down break caused by resistor 70 and capacitor 72 so that the downward slope at higher frequencies is 6 db/octave. The cross-over (gain of 0 db, i.e., unity gain) is at 7 Hz. At higher frequencies the DC path does not provide any servo control. The gain continues to decrease and even at frequencies near 600 Hz where the gain increases as a result of the L-C filter, the gain is considerably below unity. The plot for the AC path slopes upward at 3 db/octave for very low frequencies as a result of the inclusion of capacitor 98, resistor 80 and resistor 22. At a frequency of 0.16 Hz, there is a break in the plot due to the inclusion of resistor 86 and capacitor 84 so that the gain is flat at approximately 20 db. At a frequency of approximately 160 Hz, there is a down break due to resistor 22 and capacitor 26 so that the gain slopes downward at 3 db/octave, with the AC path cross-over occurring at approximately 2 khz.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

We claim:

1. A switching regulator comprising a source of unregulated voltage, output circuit means, current switching means, filter means, said current switching means being connected to extend current pulses from said unregulated voltage source through said filter means to develop a DC voltage across said output circuit means, means for controlling the periodic turning on and turning off of said current switching means at a rate which is substantially higher than the frequency of ripple components in said unregulated voltage source, DC feedback means for controlling the duty cycle of said current switching means in accordance with the changes in the DC voltage across said output circuit means, said DC feedback means comprising a conductor and an RC network connected between said output circuit means and said controlling means, and AC feedback means located between said current switching means and said DC feedback means for controlling the duty cycle of said current switching means in accordance with the voltage at a point intermediate said current switching means and said filter means said AC feedback means comprising an RC filter having a pair of resistors and a first capacitor connected in parallel to one of said pair of resistors, said AC feedback means further comprising a second capacitor connected to said controlling means.

2. A switching regulator in accordance with claim 1 wherein said duty cycle controlling means includes amplifying means for developing a voltage to control the duty cycle of said current switching means, said DC feedback means includes means for DC-coupling a voltage proportional to the voltage across said output circuit means to an input of said amplifying means, and said AC feedback means includes means for AC-coupling the voltage at said intermediate point to an input of said amplifying means, such that the voltage across said output circuit means is maintained constant independant of AC or DC changes in the voltage of said unregulated voltage source.

3. A switching regulator in accordance with claim 2 wherein said DC feedback means is effective to provide servo control to regulate the voltage across said output circuit means at frequencies substantially below the resonant frequency of said filter means, said filter means is effective to suppress variations in the voltage across said output circuit means at frequencies above said resonant frequency, and said AC feedback means is effective to provide servo control to regulate the voltage across said output circuit means at frequencies above which said DC feedback means and below which said filter means are ineffective to provide regulation.

4. A switching regulator in accordance with claim 3 wherein said duty cycle controlling means includes means for turning on said current switching means at predetermined intervals, and means for controlling the width of each current pulse extended by said current switching means through said filter means to said output circuit means in accordance with the control voltage developed by said amplifying means.

5. A switching regulator in accordance with claim 3 wherein said filter means includes capacitor means and inductor means connected in series, said DC feedback means being coupled to one end of said inductor means and said AC feedback means being coupled to the other end of said inductor means.

6. A switching regulator in accordance with claim 1 wherein said DC feedback means is effective to provide servo control to regulate the voltage across said output circuit means at frequencies substantially below the resonant frequency of said filter means, said filter means is effective to suppress variations in the voltage across said output circuit means at frequencies above said resonant frequency, and said AC feedback means is effective to provide servo control to regulate the voltage across said output circuit means at frequencies above which said DC feedback means and below which said filter means are ineffective to provide regulation.

7. A switching regulator in accordance with claim 6 wherein said filter means includes capacitor means and inductor means connected in series, said DC feedback means being coupled to one end of said inductor means and said AC feedback means being coupled to the other end of said inductor means.

8. A switching regulator in accordance with claim 1 wherein said filter means includes capacitor means and inductor means connected in series, said DC feedback means being coupled to one end of said inductor means and said AC feedback means being coupled to the other end of said inductor means.

9. A switching regulator comprising a source of unregulated voltage, output circuit means, current switching means for conducting current pulses from said unregulated voltage source to develop an unfiltered DC voltage, means for filtering said unfiltered DC voltage to develop a filtered DC voltage across said output circuit means, means for controlling the periodic turning on and turning off of said current switching means at a rate which is substantially higher than the frequency of ripple components in said unregulated voltage source, DC feedback means for controlling the duty cycle of said current switching means in accordance with changes in the filtered DC voltage across said output circuit means said DC feedback means comprising a conductor and an RC network connected between said output circuit means and said controlling means, and AC feedback means located between said current switching means and said DC feedback means for controlling the duty cycle of said current switching means in accordance with the unfiltered DC voltage developed by said current switching means said AC feedback means comprising an RC filter having a pair of resistors and a first capacitor connected in parallel to one of said pair of resistors, said AC feedback means further comprising a second capacitor connected to said controlling means.

10. A switching regulator in accordance with claim 9 wherein said duty cycle controlling means includes amplifying means for developing a voltage to control the duty cycle of said current switching means, said DC feedback means includes means for DC-coupling a voltage proportional to the filtered voltage across said output circuit means to an input of said amplifying means, and said AC feedback means includes means for AC-coupling the unfiltered DC voltage developed by said current switching means to an input of said amplifying means, such that the voltage across said output circuit means is maintained constant independent of AC or DC changes in the voltage of said unregulated voltage source.

11. A switching regulator in accordance with claim 10 wherein said DC feedback means is effective to provide servo control to regulate the voltage across said output circuit means at frequencies substantially below the resonant frequency of said filter means, said filter means includes inductor means effective to suppress variations in the voltage across said output circuit means at frequencies above said resonant frequency, and said AC feedback means is effective to provide servo control to regulate the voltage across said output circuit means at frequencies above which said DC feedback means and below which said filter means are ineffective to provide regulation.

12. A switching regulator in accordance with claim 11 wherein said filter means includes capacitor means connected in series with said inductor means, said DC feedback means being coupled to one end of said inductor means and said AC feedback means being coupled to the other end of said inductor means.

13. A switching regulator in accordance with claim 9 wherein said DC feedback means is effective to provide servo control to regulate the voltage across said output circuit means at frequencies substantially below the resonant frequency of said filter means, said filter means includes inductor means effective to suppress variations in the voltage across said output circuit means at frequencies above said resonant frequency, and said AC feedback means is effective to provide servo control to regulate the voltage across said output circuit means at frequencies above which said DC feedback means and below which said filter means are ineffective to provide regulation.

14. A switching regulator in accordance with claim 13 wherein said filter means includes capacitor means connected in series with said inductor means, said DC feedback means being coupled to one end of said inductor means and said AC feedback means being coupled to the other end of said inductor means.

15. A switching regulator in accordance with claim 9 wherein said filter means includes capacitor means and inductor means connected in series, said DC feedback means being coupled to one end of said inductor means and said AC feedback means being coupled to the other end of said inductor means.

* * * * *